United States Patent [19]

Iwashita et al.

[11] 4,009,480
[45] Feb. 22, 1977

[54] ROLL FILM CAMERA FOR USE WITH VARIOUS SIZED MAGAZINES

[75] Inventors: Tomonori Iwashita, Chofu; Hiroshi Aizawa, Machida; Susumu Kozuki, Yokohama; Masanori Uchidoi, Kawasaki, all of Japan

[73] Assignee: Canon Kabushiki Kaisha, Tokyo, Japan

[22] Filed: Feb. 13, 1975

[21] Appl. No.: 549,681

[30] Foreign Application Priority Data

Feb. 16, 1974 Japan ........................... 49-18817
Feb. 16, 1974 Japan ........................... 49-18818

[52] U.S. Cl. ............................. 354/210; 354/173; 354/212; 354/275
[51] Int. Cl.² ............................................. G03B 1/00
[58] Field of Search ........ 354/174, 210, 170, 171, 354/172, 173, 212, 213, 214, 215, 216, 159, 275, 204, 205, 206; 352/123

[56] References Cited

UNITED STATES PATENTS

| | | | |
|---|---|---|---|
| 2,988,973 | 6/1961 | Bohm et al. | 354/210 X |
| 3,286,613 | 11/1966 | Domnick | 354/210 |
| 3,762,291 | 10/1973 | Kimura et al. | 354/173 X |
| 3,805,277 | 4/1974 | Domnick | 354/210 X |

FOREIGN PATENTS OR APPLICATIONS

| | | | |
|---|---|---|---|
| 221,557 | 4/1959 | Australia | 354/210 |
| 1,214,528 | 4/1966 | Germany | 354/210 |

Primary Examiner—Edna M. O'Connor
Attorney, Agent, or Firm—Toren, McGeady and Stanger

[57] ABSTRACT

A roll film camera of the type in which the film may be contained either in a magazine of normal film frame capacity removably mounted within the camera body or in a magazine of large film frame capacity detachably mounted on the rear of the camera body and in which the film transport and shutter tensioning mechanisms are operatively connected with each other by means of a single operating member. The film transport mechanism is provided with clutch means arranged between said single operating member and the driving means for the camera side takeup spool upon attachment of the large capacity film magazine to the camera body for disconnecting the takeup spool driving means from the single operating member.

5 Claims, 14 Drawing Figures

F I G.12
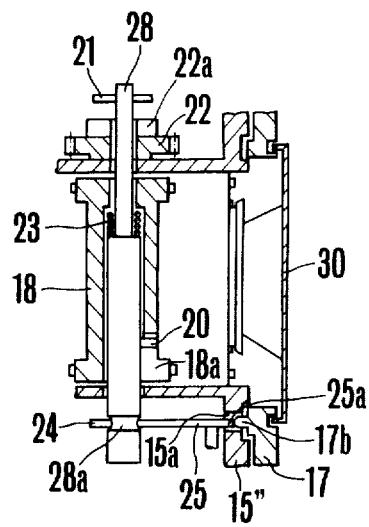
F I G.13
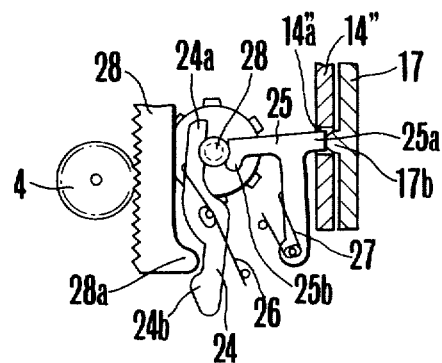

ROLL FILM CAMERA FOR USE WITH VARIOUS SIZED MAGAZINES

BACKGROUND OF THE INVENTION

This invention relates to photographic cameras, and more particularly to a film transport and shutter tensioning mechanism adapted for use in a roll film camera of the type in which the film is contained either in a magazine of normal film frame capacity loaded within the camera body, or in a magazine of large film frame capacity detachable from the rear of the camera body.

Most of the commercially available 35mm film magazines of normal film frame capacity contain 20 to 36 frames of film. In application to photography with a motor driven camera for purposes of taking a large number of picture frames in sequence, however, this normal capacity film magazine is very inconvenient because of the necessity of successive frequent interchanges of the exposed magazine by a new one. Recently, there has been developed a large capacity film magazine containing about 250 frames of film. With the camera associated with such a large capacity film magazine, while the film is transported between a pair of spools contained in the magazine, each frame is advanced by the film transport mechanism incorporated in the camera. As customary, the film transport mechanism is operatively connected to the shutter tensioning mechanism so that a predetermined motion of a single operating member will serve both tension the shutter and to advance the film through the space of one frame. This arrangement creates various problems in operating with the large capacity film magazine while the single operating member is being driven by the motor associated with the camera. For example, when intermittently advancing the film, the deviation of movement of the take-up spool in the magazine from the predetermined relation to the movement of the sprocket in the camera sometimes results in formation of a loop of loose film therebetween. This loop of film may cause the film surface to be scratched by the camera side take-up spool, or to be caught in a space between the camera side take-up spool and the sprocket, thereby making it difficult to perform a smooth film transport operation. This problem becomes more serious in a camera employing a sprocket and spool arranged rotatable in opposite directions relative to each other.

As the complexity of the camera structure increases, the sprocket wheel having eight teeth for engagement with the perforation holes of the film is replaced by a sprocket having six teeth to reduce the dimension of the space which is occupied by the sprocket means. In this case, the sprocket must be turned through four-thirds revolutions to advance the film one frame, and therefore must be provided with an excessively complex and expensive braking device. In order to avoid this difficulty, the driving means for the sprocket is operatively connected to the single operating member, so that a predetermined angular movement (for example, 120°) of the cocking lever constituting part of the single operating member causes a turning movement of the sprocket through fourthirds revolutions which in turn causes advancement of film through the space of one frame.

In a camera of such construction, the sprocket and the take-up spool are arranged to be rotatable in opposite directions to each other, or otherwise the accuracy and reliability in controlling the intermittent advancement of the film would be reduced because of the decrease in the number of sprocket teeth. For this reason, it is particularly important to cope with the problem of preventing the formation of a loop of loose film. According to one solution, a driving torque is imparted by an electric motor to the take-up spool in the large capacity film magazine to exert a tension on the film between the sprocket and the above-identified spool. This tension often causes residual motion of the film in the film gate, resulting in undesirable variations in the quality of image reproduction.

SUMMARY OF THE INVENTION

Accordingly, the present invention is adapted to overcome the above mentioned conventional drawbacks by controlling the operative interconnection between the camera side take-up spool driving means and the single operating member of the film transport and shutter tensioning mechanism in the camera.

An object of the invention is to provide a film transport and shutter tensioning mechanism adapted for use in a roll film camera of the type in which the film is contained either in a magazine of normal film frame capacity loaded within the camera body, or in a magazine of large film frame capacity detachable from the rear of the camera body. One embodiment of the invention comprises a clutch mechanism arranged between the camera side take-up spool driving means and the above-identified operating member and cooperative with a clutch release member arranged upon attachment of the large capacity film magazine to the rear of the camera body to release the clutch mechanism to an inactive position where the camera side take-up spool is disconnected from the single operating member while both the sprocket mechanism and the shutter tensioning mechanism remain connected thereto.

Another object of the invention is to provide a film transport and shutter tensioning mechanism arranged in a roll film camera of the type described so that the film transport mechanism is rendered inoperative in automatic response to an attachment of a large capacity film magazine having a film advance mechanism incorporated therein, whereby the one-frame advance of the film is accurately and reliably controlled by the film advance in the magazine.

Other objects and features of the invention will become apparent from the following detailed description taken in conjunction with the accompanying drawings in which:

BRIEF DESCRIPTION OF THE DRAWINGS

FIG. 12 is a sectional view of the sprocket release mechanism of FIG. 9 and a fragment of the camera body associated with a large capacity film magazine, the mechanism being shown in the active position.

FIG. 13 is a bottom view of the mechanism of FIG. 12, and a fragment of the shutter tensioning mechanism.

DETAILED DESCRIPTION OF THE INVENTION

Figure 1:
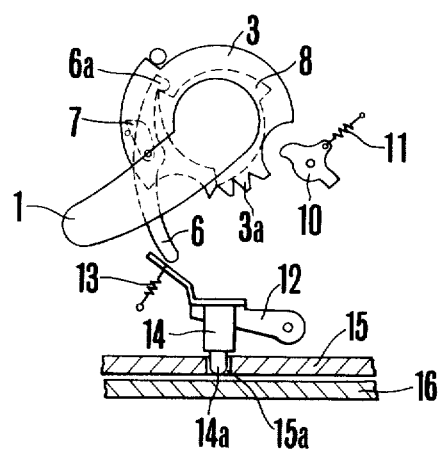
FIG. 1 is a top view of a clutch mechanism in combination with a clutch release member according to one embodiment of the invention as applied to an example of the film transport and shutter tensioning mechanism of a roll film camera associated with a normal capacity film magazine, the clutch mechanism being shown in its active position.
Figure 2:
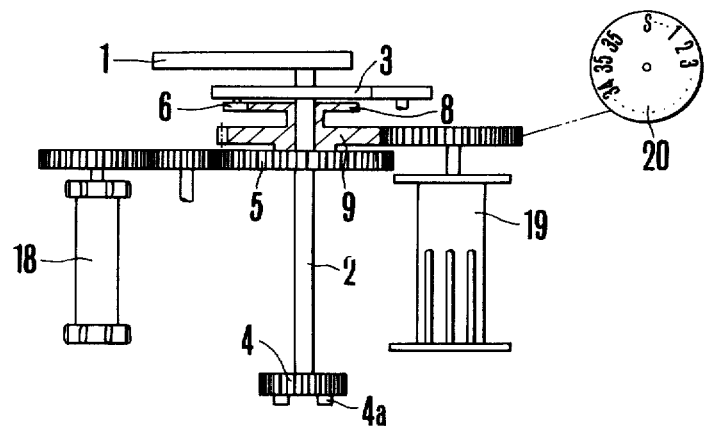
FIG. 2 is a schematic partly elevational partly sectional view of the clutch mechanism and film transport mechanism of FIG. 1.
Figure 3:
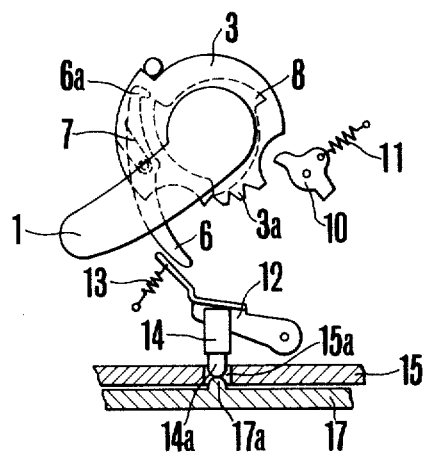
FIG. 3 is a top view of the embodiment of FIG. 1 with a fragment of the camera body associated with a large capacity film magazine, the clutch mechanism being shown in a released position.

Referring now to FIGS. 1, 2 and 3, there is shown a preferred embodiment of the invention comprising a clutch mechanism as arranged between the single operating member of the film transport and shutter tensioning mechanism and the driving means for the take-up spool thereof in a roll film camera of the type in which the film may be contained either in a magazine of normal film frame capacity (FIG. 1) loaded within the camera body or in a magazine of large film frame capacity (FIG. 3) detachable from the rear of the camera body. The clutch mechanism of the invention comprises a pawl lever 6 which is fulcrumed at a pin extending from the lower side of a disc 3 as viewed in FIG. 2 and which is biased by a spring 7 to urge the pawl 6a of lever 6 into engagement with a three-pawled disc 8 rotatably mounted on a shaft 2. The shaft 2 has a film winding lever 1 secured to one end thereof for rotating shaft 2, the opposite end of which is drivingly connected to a pinion 4 having a pair of projections 4a for association with a camera driving apparatus including a motor, the parts 1, 2 and 3 constituting the above-identified single operating member, and the pinion 4 constituting part of the shutter tensioning mechanism and also being connected through a rack mechanism to the mirror driving mechanism (not shown) and EE control mechanism of the camera.

The film transport mechanism includes a gear 9 rotatably mounted on shaft 2 and secured to the pawl disc 8, a take-up spool of which the drive shaft is connected through a gear train to the gear 9, a gear 5 drivingly connected to shaft 2 and a sprocket 18 of which the drive shaft is connected through a gear train including gear 5 to the single operating member 1, 2, 3. The take-up spool driving gear arrangement is connected through the clutch mechanism of the invention to the operating member 1, 2, 3, and also is connected to the film frame indicator dial 20 through a mechanical linkage. In order to insure the predetermined angular motion of the operating member for advancing the film through exactly one frame space during each film-winding operation, there is provided a lever 10 biased by a spring 11 and arranged to be brought into cooperation with a toothed portion 3a provided in disc 3 when the lever 1 is cocked to thereby prevent the reverse rotation of the operating member until the movement of lever 1 through the predetermined angular distance is completed. Upon completion of movement of lever 1, the pawl of lever 10 is disengaged from the toothed portion 3a in a manner known in the art to permit the reverse turning movement of lever 1 to the initial position shown in FIG. 1 under the action of a spring not shown.

Figure 4:
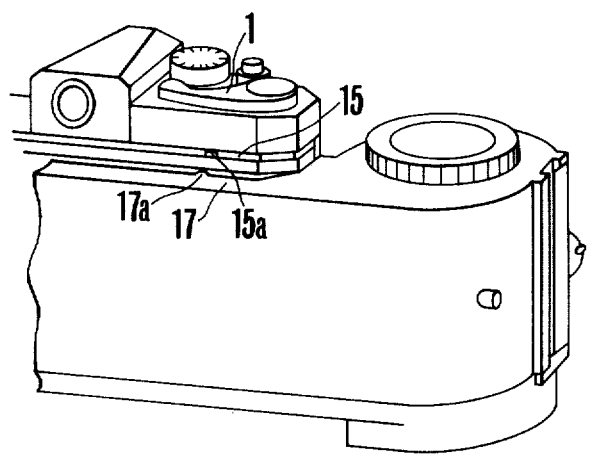
FIG. 4 is a perspective view of a fragment of the roll film camera of FIGS. 1 through 3 and a fragment of the magazine of FIG. 3 which is about to attach to the rear of the camera body.

The clutch mechanism of the invention is provided with a clutch release member constructed with a one-arm lever 12 of which the free end extends into the path of movement of the tail of pawl lever 6 and is connected to a spring 13 which urges a rectangularly bent portion of lever 12 into normally abutting engagement with one end of an actuating pin 14. The opposite end 14a of pin 14 extends into a hole 15a provided through the rear wall 15 of the camera housing adjacent the back cover 16 thereof (FIG. 1). As shown in FIG. 4, the large capacity film magazine 17 may be attached to the rear of the camera body without the back cover 16 while a projection 17a of magazine is inserted into the hole 15a to push the actuating pin 14 at the end 14a in the upward direction as viewed in FIG. 3.

The operation of the mechanisms of FIGS. 1, 2 and 3 is as follows. With the camera associated with a film magazine of normal capacity (for example, a 36 frames available film magazine), the clutch mechanism assumes the position shown in FIG. 1, so that the counterclockwise cocking movement of lever 1 is transmitted both to the sprocket 18 through gear 5 and to the take-up spool 19 through the clutch mechanism 6, 8 and gear 9, whereby the film advanced by the sprocket 18 past the film gate is wound up on the take-up spool 19. If the camera operator desires to operate the camera by the help of a motor-driving apparatus and by use of a large capacity film magazine (for example, a 250 frames available film magazine), the magazine is attached to the rear of the camera body without the back cover 16 as shown in FIG. 4, while the projection 17a of the magazine 17 is inserted into the hole 15a of the camera to push the actuating pin 14 in the upward direction as shown in FIG. 3. Such upward movement of pin 14 causes the pawl lever 6 to turn in a counterclockwise direction against the force of spring 7 in engagement of the tail of lever 6 with the free end of lever 12 until the pawl 6a is disengaged from any one of the three pawls of disc 8, with the result that the motion of shaft 2 driven by the motor-driving apparatus through the pinion 4 and its projections 4a is transmitted to the sprocket 18 but not to the take-up spool 19. The motion of pinion 4 through a predetermined angular distance also serves to tension the shutter (not shown). The film F advanced by the sprocket 18 is wound up on the take-up spool 21 in the magazine 17 as shown in FIG. 5.

Figure 5:
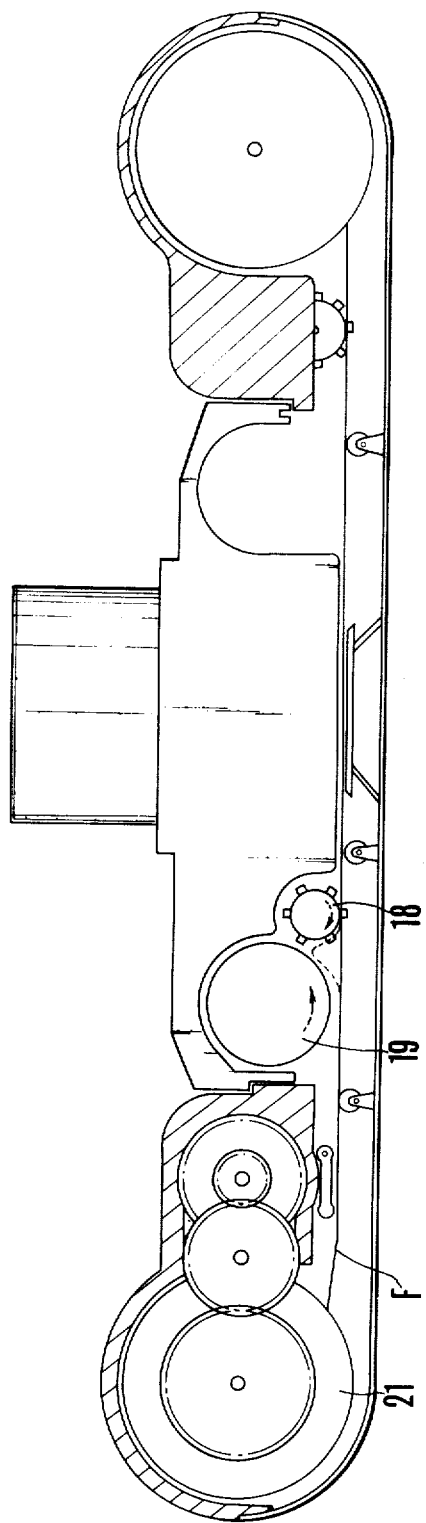
FIG. 5 is a schematic partly elevational partly sectional view of the camera associated with the magazine of FIG. 4.
Figure 6:
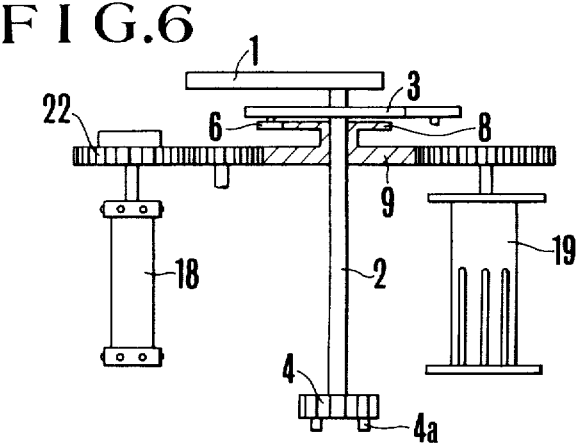
FIG. 6 is a schematic partly elevational sectional view of the clutch mechanism of FIGS. 1 and 2 as applied to another example of the film transport and shutter tensioning machanism.

It will be appreciated from the foregoing description that the present invention contemplates the use of a clutch mechanism arranged between the single operating member and the take-up spool driving means upon attachment of a large capacity film magazine to the rear of the camera body to set the take-up spool in the idle position, whereby the loosed portion of the film between the camera side sprocket and the magazine side take-up spool does not form a loop between the camera side sprocket 18 and take-up spool 19 as indicated by dashed lines in FIG. 5 to minimize the possiblity of rolling the looped portion of the film into the space between sprocket 18 and take-up spool 19. This is very advantageous for stabilization of the film transport operation. Another advantage deriving from the inoperativeness of the take-up spool driving means and accordingly the inoperation of the film counter 20 is that the magnitude of driving torque necessary for operating the camera may be correspondingly reduced. Further, the effectiveness of the invention is not confined to the control of the driving interconnection between the single operating member and the take-up spool driving means. For example, the clutch mechanism of the invention may be arranged between the single operating member and the film transport mechanism so that a multiplicity of images on a single frame may be formed with the camera set for association with the normal capacity film magazine. An example of the combination of the clutch mechanism and the transport mechanism which is adapted for this purpose is shown in FIG. 6, wherein the gear 9 fixedly secured to the pawl disc 8 acts as a common drive control means for the sprocket 18 and take-up spool 19. In the above mentioned embodiment, the clutch release member is arranged to be operable in automatic response to an attachment of the large capacity film magazine to the camera body. However, such an arrangement of the clutch release member may be modified so as to render the clutch release member operable manually as well as automatically from the outside of the camera.

Figure 7:
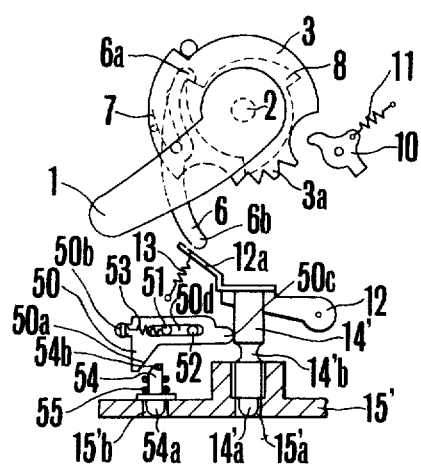
FIG. 7 is an elevational view of the clutch release member of FIG. 1 modified as cooperating with a detent device, the detent device being shown in an inactive position.
Figure 8:
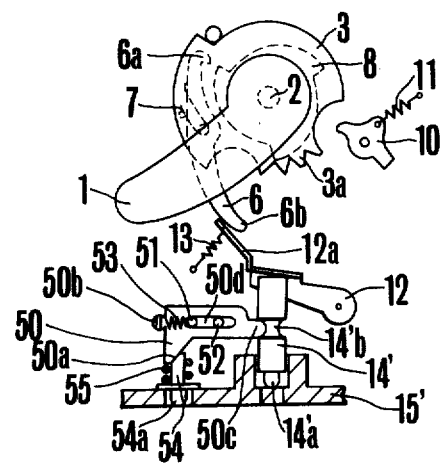
FIG. 8 is a similar view with the detent device disposed in the active position.
Figure 9:
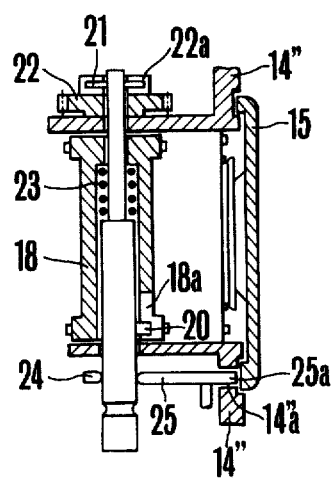
FIG. 9 is a sectional view of a sprocket release mechanism according to the invention, and a fragment of the camera body associated with a normal capacity film magazine, the mechanism being shown in its inactive position.
Figure 10:
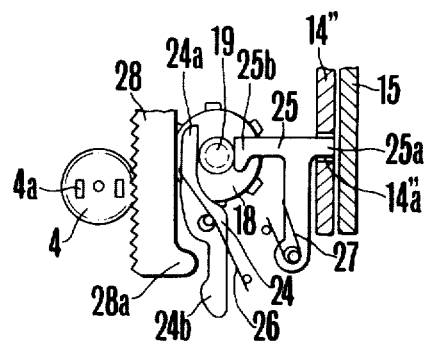
FIG. 10 is a bottom view of the mechanism of FIG. 9 and a fragment of the shutter tensioning mechanism.
Figure 11:
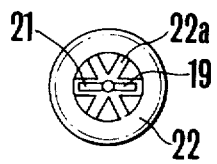
FIG. 11 is a fragmentary top view of the sprocket release mechanism of FIG. 9.

In FIG. 7 and FIG. 8, there is shown an example of the manually operable clutch release mechanism as comprising a clutch release member of similar construction and arrangement to those shown in FIG. 1 or FIG. 3 except that the actuating pin 14' is provided with a circumferentially recessed portion 14b' formed at the center thereof and adapted for engagement with a projection 50c of a detent slide 50. The detent slide 50 has an elongated slot 50d in which are engaged a pair of guide pins 51 and 52, and is biased by a spring 53 connected between the pin 51 and the end 50b of slide 50 opposite to that having the projection 50c toward the right as viewed in FIG. 7 or FIG. 8. The slide 50 is further provided with a tapered surface portion 50a which slidably engages a pin 54 at a tapered portion 54b formed at one end thereof, the opposite end of which extends into a second hole 15b' provided through the rear wall 15' of the camera housing when the pin 14' is released from the locked position shown in FIG. 8 to the rest position shown in FIG. 7 by pushing the pin 54 at the end 54a against the force of a helical expansion spring 55.

The operation of the manually operable clutch release mechanism of FIGS. 7 and 8 is as follows. Before the large capacity film magazine is attached to the camera body, the operator has to set the actuating pin 14 by depression at the end 14a from the position of FIG. 7 to the position of FIG. 8, while the pawl lever 6 is turned counter-clockwise in abutting engagement of lever tail 16 with the free end 12a of lever 12 against the force of springs 7 and 13, until the projection 50c of detent slide 50 engages in the circumferential groove 14'b to hold the actuating pin 14 in the advanced position shown in FIG. 8, where the lever pawl 6a is disengaged from any one of the pawls of disc 8. After the magazine is detached from the camera, the operator has to depress the detent release pin 54 against the force of spring 55. The upward movement of pin 54 is transmitted through the tapered cam arrangement 50a and 54b to the retracting movement of slide 50 against the force of spring 53 to disengage the slide projection 50c from the groove 14'b which in turn causes downward movement of pin 14' under the force of spring 12 to the position of FIG. 7.

The film transport mechanism of FIG. 6 is not suited for use in a camera of the type described above, because the motion of sprocket 18 is transmitted through the common drive control gear 9 to the take-up spool 19 as the film is transported from the supply spool to the take-up spool within the large capacity film magazine by means of the magazine side sprocket while the perforation holes of the film engages the camera side sprocket 18, although the transmission of the motion of pinion 4 to the shutter tensioning mechanism is achieved without causing the driving of the film transport mechanism by the setting of the clutch mechanism in the inactive position. In coping with this problem, the sprocket mechanism in the camera is so constructed that when using the large capacity film magazine, the sprocket is disconnected from the driving means therefor.

The sprocket mechanism of such construction is shown in FIGS. 9 through 13 as comprising a sprocket 18 and a sprocket drive gear 22 operatively interconnected with each other through a sprocket shaft 28. The sprocket shaft 28 has a radially extending pin 20 fixedly mounted thereon to engage in a longitudinally elongated slot 18a formed in the sprocket 18. The pin 20 and slot 18a connection serves to transmit the motion of shaft 28 to sprocket 18 and to permit a predetermined longitudinal movement of shaft 28 relative to sprocket 18. The sprocket shaft 28 is further provided with two radially extending arms 21 fixedly mounted at the upper end as viewed in FIG. 9 to engage in one of three radial grooves 22a provided on the sprocket drive gear 22 when the sprocket mechanism assumes the active position shown in FIG. 9, FIG. 10 or FIG. 11. The arm 21 and groove 22a connection serves to transmit the motion of gear 22 to the sprocket shaft 28. For setting the sprocket 18 from the active position to the idle position, the camera operator may depress the sprocket shaft 28 at the lower end which is accessible from the outside of the camera against the force of an expansion spring 23 positioned between sprocket 18 and shaft 23 until the sprocket shaft 28 is caught at a circumferentially recessed portion 28a by one arm 24a of a lever 24 as shown in FIGS. 12 and 13. The lever 24 which is fulcrumed at a pin fixedly mounted in the camera housing and which is biased by a tension spring 26 to urge the arm 24a toward the shaft 28 is provided with a protuberance arranged on the opposite arm thereof to be struck by a projection 29a of a rack 29 cooperating with the pinion 4 each time the shutter is cocked. The sprocket mechanism further includes a second lever 25 which has a first projection 25a extending into a second hole 14"a provided through the rear wall 14" of the camera housing and has a second projection 25b for engagement with the recessed portion 28a of sprocket shaft 28 and which is biased by a hair pin spring 27 in a clockwise direction. This lever 25 is arranged so that only when the sprocket shaft 28 is set in the inactive position where the lever arm 24a engages the recessed portion 28a as shown in FIG. 12 or FIG. 13, the large capacity film magazine 17 can be completely attached to the camera while turning the lever 25 in the counter-clockwise direction in engagement of projection 25a with a projection 17b of magazine 17.

Consideration will now be given to the operation of the camera having the film transport mechanism of FIG. 6 provided with the clutch mechanism of FIGS. 1 and 3 and with the sprocket mechanism of FIGS. 9 through 13. In order to make exposures using a roll film of 36 frames in a magazine loaded within the camera body, the camera operator turns the film winding lever 1 in the counter-clockwise direction through an angular distance of about 120°, whereby the camera shutter is tensioned and the film is advanced through the space of one frame as the turning movement of lever 1 is transmitted through the pawl lever 6 and pawl disc 8 connection to the common drive control gear 9, and therefrom is transmitted both to the take-up spool 19 and to the sprocket 18 through their respective driving gear trains, whereby the sprocket mechanism assumes the position shown in FIGS. 9 and 10. After that, the operator may remove his finger from the fully advanced lever 1, permitting the lever 1 to turn backward under the force of a spring (not shown) to the position shown in FIG. 1, whereupon the pawl 6a is brought into engagement with the next pawl of disc 8. To rewind the film by some or all of the advanced frames of film, the sprocket shaft 28 has to be set from the active position of FIG. 9 to the inactive position of FIG. 12 where the arms 21 are disengaged from the groove 22a. This disengagement is ensured by the locking engagement of circumferential groove 28a with the lever arm 24a. After the desired rewinding operation has been completed, the operator may turn the lever 1 to move the rack 29 in a downward direction as viewed in FIG. 10, whereupon the projection 29a strikes the lever tail 24b, causing lever 24 to turn counter-clockwise against the force of spring 26. Such turning movement of lever 24 results in a downward movement of sprocket shaft 28 to the position of FIG. 9 where the arms 21 engage in one of the grooves 2a to permit the transmission of motion of gear 22 to the sprocket 18 through the pin 20 and slot 18a connection.

In order to make exposures using a roll film of 250 frames in a magazine of the type adapted for attachment to the rear of the camera body, the camera operator has first to depress the sprocket shaft 28 until the circumferential groove 28a engages the lever arm 24a. Next the magazine 17 is attached to the camera body, while the first and second projections 17a and 17b of magazine 17 are inserted into the respective holes 15a and 15"a as shown in FIGS. 4 and 13 respectively. Upon depression of lever end 25a by the second projection 17b, the lever 25 is turned counter-clockwise, causing the lever end 25b to enter circumferential groove 28a. The lever 25 is permitted to assume this locking position until the magazine 17 is detached from the camera. Upon depression of the actuating pin 14 by the first projection 17a, the lever 12 is turned clockwise causing pawl lever 6 to turn counter-clockwise against the force of spring 7. Such turning movement of lever 6 results in disengagement of pawl 6a from pawl disc 8, whereby the sprocket 18 and take-up spool 19 are disconnected from the single operating member 1, 2, and 3. This situation continues until the magazine 17 is detached from the camera body. So long as the camera operates with the clutch mechanism set in the inactive position of FIG. 3, each cocking operation of lever 1 serves to tension the shutter through the pinion 4, to charge the mirror drive mechanism and to charge EE mechanism, but it does not serve to advance the film.

Figure 14:
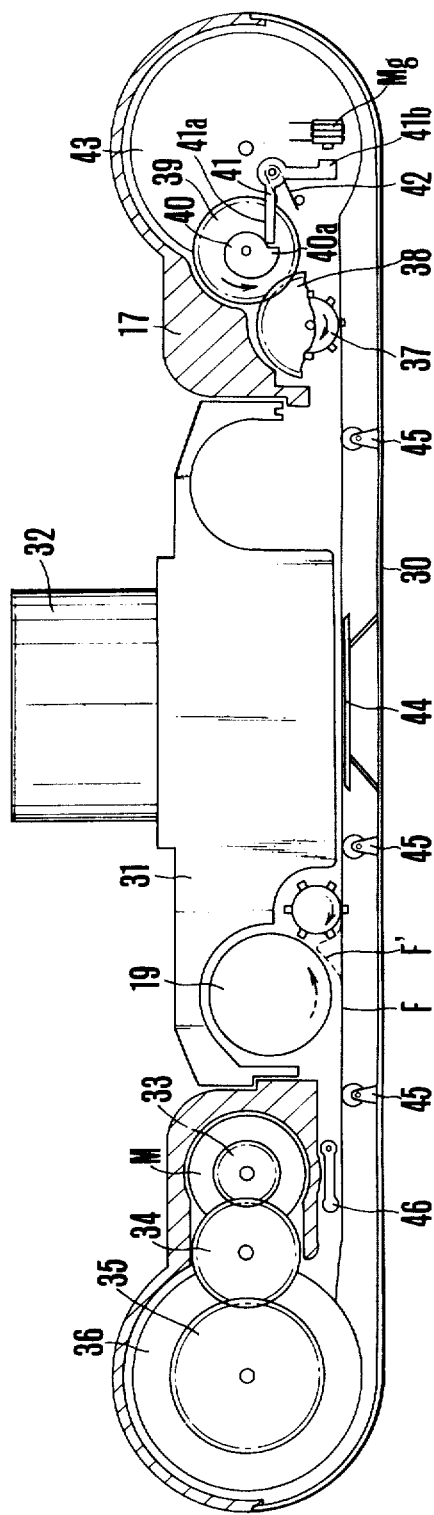
FIG. 14 is a partly elevational partly sectional view of the camera of FIG. 5 associated with a large capacity film magazine embodying one form of the invention, showing the control for film winding and advancing operation in the magazine.

Referring now to FIG. 14, there is shown an example of the construction of a large capacity film magazine adapted for use with the camera of the type described. The magazine which is designated at 17 and is associated with the camera having a housing 31 and an objective lens barrel 32 attached to the front wall of housing 31 is constructed as including supply and take-up spools 36 and 43 to which respective ends of a roll film are attached, a motor M of which the output shaft is connected through a gear train 33, 34 and 35 to the take-up spool 36, and a film feed control mechanism positioned adjacent the supply spool 43. The film feed control mechanism comprises a sprocket 37 connected through a gear train 38 and 39 to a cam disc 40 having a cam notch 40a interacting with one end 41a of a two-armed cam lever 41 which is pivoted at a pin affixed to the magazine housing and which is biased by a hair pin spring 42 in a clockwise-direction to urge the lever end 41a into sliding engagement with the camming surface of cam disc 40. Positioned adjacent the other end 41b of cam lever 41 is an electro-magnet Mg whose energization to attracts the lever end 41b, whereby the cam lever 41 is caused to turn counter-clockwise. This counter-clockwise movement of lever 41 releases the cam disc 40 for advancement of one frame of film past the film gate in front of a pressure plate 44 as it is guided by a number of rollers 45 while rotating the camera side sprocket in engagement with the perforation holes of the film without causing the camera side take-up spool 19 to rotate therewith. The film detector is indicated at 46.

The operation of the magazine of FIG. 14 attached to the camera of the invention as driven by a known motor drive apparatus is as follows. When the shutter release bottom (not shown) is depressed, the shutter mechanism of the camera 31 operates with the motor drive apparatus. Upon termination of the exposure operation, the electro-magnet Mg in the magazine is energized to turn the cam lever 41 in the counter-clockwise direction against the force of spring 42, disengaging the end 41a of lever 41 from the cam notch 40a of cam disc 40, and simultaneously the motor M in the magazine is energized to drive the take-up spool 36 through the gear train 33, 34 and 35, while the pinion 4 is driven by the motor drive apparatus engaging with the projections 4a on pinion 4 to tension the shutter and to charge the mirror drive and EE control mechanisms. In a short time interval after the initiation of advancement of the film, the electro-magnet Mg is de-energized permitting the cam lever 41 to turn clockwise under the action of spring 42, so that the lever end 41a cams the cam disc 40 to ensure exactly one complete revolution of cam disc 40 and associated gear 39.

Upon engagement of lever end 41a with cam notch 40a, the motor M is de-energized. At this time, the camera and magazine are made ready for the next exposure operation.

It will be seen from the foregoing description that the present invention provides a roll film camera of the type in which the film transport mechanism is rendered inoperative in automatic response to an attachment of a large capacity film magazine to the rear of the camera body for permitting the film advance mechanism provided in the magazine to operate with the film while preventing formation of a loop of loosed film in the space between the camera reversely-rotating side sprocket 18 and take-up spool 19 as indicated by dashed lines in FIG. 14 which would otherwise occur in the camera employing the conventional film transport and shutter tensioning mechanism. The arrangement of the film advance mechanism within the magazine according to the invention provides a long space between the film gate and the sprocket 37 in the magazine to thereby facilitate the minimization of distortion of the film in the film gate.

Another feature of the invention is that the mechanism in the magazine of large film frame capacity and the camera mechanism are driven by separate motors to permit selection of a motor of smaller driving torque than was previously necessary for employment as the motor in the magazine, thereby giving additional advantages of preventing the damage of perforation holes of the film by the sprocket teeth and reducing the tension of the film wound on the take-up spool due to the correspondingly decreased momentum of the take-up spool being driven by the motor.

What is claimed is:

1. A roll film camera comprising a camera body, a large capacity film magazine adapted for attachment to the rear of said camera body, magazine supply and take-up spools rotatably mounted within said magazine, a film transport mechanism included in said camera body, said film transport mechanism having a camera body take-up spool and driving means operatively associated therewith, clutch means operatively arranged between said camera body take-up spool and said driving means, and actuating means for said clutch means to operatively disconnect said camera body take-up spool from said driving means in automatic response to attachment of said magazine to the rear of said camera body.

2. A roll film camera according to claim 1, wherein said film transport mechanism further includes a film advance sprocket wheel assembly associated with said take-up spool driving means.

3. A roll film camera according to claim 1 further comprising a single frame advancing means, and means for rendering said single frame advancing means inoperative when said magazine is attached to said camera body.

4. A roll film camera according to claim 3 further comprising another single frame advancing means included within said magazine.

5. A roll film camera according to claim 4 further comprising second clutch means arranged between said camera body take-up spool and said single frame advancing means in said camera body.

* * * * *